(12) United States Patent
Lee et al.

(10) Patent No.: US 8,345,008 B2
(45) Date of Patent: Jan. 1, 2013

(54) APPARATUS AND METHOD FOR PROVIDING ADAPTIVE ON-SCREEN KEYBOARD

(75) Inventors: Hyun-jeong Lee, Seoul (KR); Joon-ah Park, Seoul (KR); Wook Chang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 960 days.

(21) Appl. No.: 12/076,944

(22) Filed: Mar. 25, 2008

(65) Prior Publication Data

US 2009/0146957 A1    Jun. 11, 2009

(30) Foreign Application Priority Data

Dec. 10, 2007    (KR) ......... 10-2007-0127867

(51) Int. Cl.
*G06F 3/02*    (2006.01)

(52) U.S. Cl. ........ 345/168; 345/169; 345/173; 345/174; 715/773

(58) Field of Classification Search ............ 345/168, 345/173, 169, 639, 156, 157, 158, 163, 159, 345/174; 340/5.4, 5.54; 715/773
See application file for complete search history.

(56) References Cited

U.S. PATENT DOCUMENTS

| | | | | |
|---|---|---|---|---|
| 5,971,636 A | * | 10/1999 | Mensick | 400/489 |
| 6,121,960 A | | 9/2000 | Carroll et al. | |
| 6,433,774 B1 | * | 8/2002 | D'Hooge | 345/157 |
| 7,042,442 B1 | * | 5/2006 | Kanevsky et al. | 345/169 |
| 2004/0046744 A1 | * | 3/2004 | Rafii et al. | 345/168 |
| 2005/0225538 A1 | * | 10/2005 | Verhaegh | 345/173 |

FOREIGN PATENT DOCUMENTS

| | | |
|---|---|---|
| KR | 10-2005-0016691 | 2/2005 |
| KR | 10-2005-0019906 | 3/2005 |
| WO | WO 2007/093984 A2 * | 8/2007 |

* cited by examiner

*Primary Examiner* — Lun-Yi Lao
*Assistant Examiner* — Olga Merkoulova
(74) *Attorney, Agent, or Firm* — Staas & Halsey LLP (57) ABSTRACT

An apparatus and method for providing an adaptive on-screen keyboard are provided. The apparatus includes a sensor for detecting touch action of a user from a touch screen, a pattern recognizer for recognizing a touch pattern of the user using the detected touch action of the user, a rearrangement processor for reconstructing the key arrangement of the on-screen keyboard to be provided through the touch screen on the basis of the recognized touch pattern of the user, and a display for displaying the on-screen keyboard on the basis of information on the reconstructed key arrangement. Thus, the apparatus can increase the convenience of use when the user makes use of the on-screen keyboard.

13 Claims, 12 Drawing Sheets

FIG.5A guide: Finger Position-Related Guide

APPARATUS AND METHOD FOR PROVIDING ADAPTIVE ON-SCREEN KEYBOARD

CROSS REFERENCE TO RELATED APPLICATIONS

This application claims priority from Korean Patent Application No. 10-2007-0127867, filed on Dec. 10, 2007, the disclosure of which is incorporated herein in its entirety by reference.

BACKGROUND OF THE INVENTION

1. Field of the Invention

The present invention relates to a user interface, and more particularly, to an on-screen keyboard using a touch screen.

2. Description of the Related Art

Typically, an on-screen keyboard is a device that shows a virtual key input device (i.e. keyboard), compatible with a display such as a touch screen, on the screen and directly receives the key value of a position touched through the screen.

In general, the on-screen keyboard may be applied to all types of devices to which the touch screen is applied so as to input characters, such as a note book PC, an ultra mobile personal computer (UMPC), a portable multimedia player (PMP), a navigation system, a mobile phone, and so on. This on-screen keyboard is designed to enable inputs based on a pen or a finger

SUMMARY OF THE INVENTION

The present invention provides an apparatus and method for providing a user-adaptive on-screen keyboard in order to enhance the convenience to a user of the on-screen keyboard.

According to an aspect of the present invention, there is provided an apparatus for providing an adaptive on-screen keyboard, which includes a sensor for detecting touch action of a user from a touch screen; a pattern recognizer for recognizing a touch pattern of the user using the detected touch action of the user; a rearrangement processor for reconstructing the key arrangement of the on-screen keyboard to be provided through the touch screen on the basis of the recognized touch pattern of the user; and a display for displaying the on-screen keyboard on the basis of information on the reconstructed key arrangement.

Here, the sensor may detect a position and an area of at least one contact corresponding to the touch action of the user using a multi-touch sensor. The pattern recognizer may recognize the touch pattern of the user by checking to which key of which region each contact corresponds using the detected position and area of the at least one contact. Further, the rearrangement processor may adjust positions and sizes of multiple keys constituting the keyboard on the basis of the detected position and area of the at least one contact, and reconstruct the key arrangement to be adapted to the touch pattern of the user.

Meanwhile, the apparatus may further include a storage, which stores information on both the touch pattern of the user including the position and area of the detected at least one contact, and the key arrangement corresponding to the touch pattern of the user, wherein the rearrangement processor stores the information on the touch pattern of the user and the information on the reconstructed key arrangement in the storage, and reflects the stored results in the key arrangement afterwards.

Further, if an instruction for requesting the user to touch at least one reference finger is presented, the sensor may detect at least one contact touched by the user in response to the instruction. Or, if an instruction for requesting the user to input a predetermined word is presented, the sensor may detect at least one contact touched by the user in response to the instruction.

In addition, the rearrangement processor may obtain a curve passing a midpoint of the detected at least one contact, and reconstruct the key arrangement on the basis of the curve within a predetermined region defined by the curve.

According to another aspect of the present invention, there is provided a method for providing an adaptive on-screen keyboard, which includes: detecting touch action of a user from a touch screen; extracting at least one contact from the detected touch action of the user, and recognizing a touch pattern of the user using the at least one contact; reconstructing the key arrangement of the on-screen keyboard to be provided through the touch screen on the basis of the recognized touch pattern of the user; and displaying the on-screen keyboard on the basis of information on the reconstructed key arrangement.

Here, the detecting of the touch action may include presenting an instruction for requesting the user to touch at least one reference finger, and detecting at least one contact touched by the user in response to the instruction. Or, the detecting of the touch action may include presenting an instruction for requesting the user to input a predetermined word and detecting at least one contact touched by the user in response to the instruction.

Further, the recognizing of the touch pattern may include checking to which character key of which region each contact corresponds using the detected position and area of the at least one contact, and recognizing the touch pattern of the user.

In addition, the reconstructing of the key arrangement may include adjusting positions and sizes of multiple keys constituting each keyboard on the basis of the detected position and area of the at least one contact, and reconstructing the key arrangement so as to be adapted to the touch pattern of the user.

Additional aspects of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the aspects of the invention.

DETAILED DESCRIPTION OF EXEMPLARY EMBODIMENTS

The invention is described more fully hereinafter with reference to the accompanying drawings, in which exemplary embodiments of the invention are shown. The detailed descriptions of known function and construction unnecessarily obscuring the subject matter of the present invention will be avoided hereinafter. Further, technical terms, as will be mentioned hereinafter, are terms defined in consideration of their function in the present invention, which may be varied according to the intention or practices of a user or operator, so that the terms should be defined based on the contents of this specification.

The present invention is directed to a multi-touch sensor-based on-screen keyboard. In general, such an on-screen keyboard receives a character from a user by providing a key image to a touch screen and enabling the user to touch a specific key on the provided key image. At this time, in order to touch the key, the user uses a pen-like stylus or a finger according to the type of the touch screen or the size of the key region.

In the case in which the character is input using the stylus, a tip of the stylus is relatively small, and thus there is little difference according to its size when touching the specific key. However, in the case in which the character is input using the finger, an invariable key image is provided regardless of the size of the finger or hand of the user who inputs the characters, so that there is a difference in the error rate or convenience of use of the on-screen keyboard according to the size of the finger, and so on.

This difference may serve as a criterion on the basis of which the user selects a desired apparatus. As such, an embodiment of the present invention is directed to an apparatus and method for providing an adaptive on-screen keyboard that is suitable for the user in consideration of the finger size of the user or the position of each key which is comfortable to the user.

When a physical QWERTY keyboard is actually used for a personal computer (PC), positions of "f" and "j" keys become reference positions when the hands of the user are placed on the keyboard, and have a distinguishing mark. Thus, persons familiar to the keyboard may easily find the reference positions through touch on the "f" and "j" keys without looking at the key arrangement of the keyboard. In view of this principle, the keys are arranged on the basis of an initial contact of the user when the on-screen keyboard is used. As a result, the on-screen keyboard may provide high convenience of use like the physical QWERTY keyboard of the PC.

In detail, when the user inputs the characters using the on-screen keyboard, the keys of the on-screen keyboard are arranged on the basis of the positions of the hands which are placed on the screen without looking at a screen. This user-adaptive key arrangement of the on-screen keyboard enables the user to easily input the characters by adapting to the finger size or hand shape of the user.

When the user touches the screen with his/her fingers in order to input the characters, the apparatus for providing a user-adaptive on-screen keyboard according to an embodiment of the present invention recognizes the position and width of the contact of each finger, designates the positions of the keys so as to correspond to the recognized positions of the fingers, and reconstructs the keys so as to correspond to the contact width of each finger. Further, when the user makes use of the apparatus for providing a user-adaptive on-screen keyboard according to an embodiment of the present invention, key touch patterns (position, size) associated with the user's input of the characters are stored and reflected in a keyboard layout afterwards.

Figure 1:
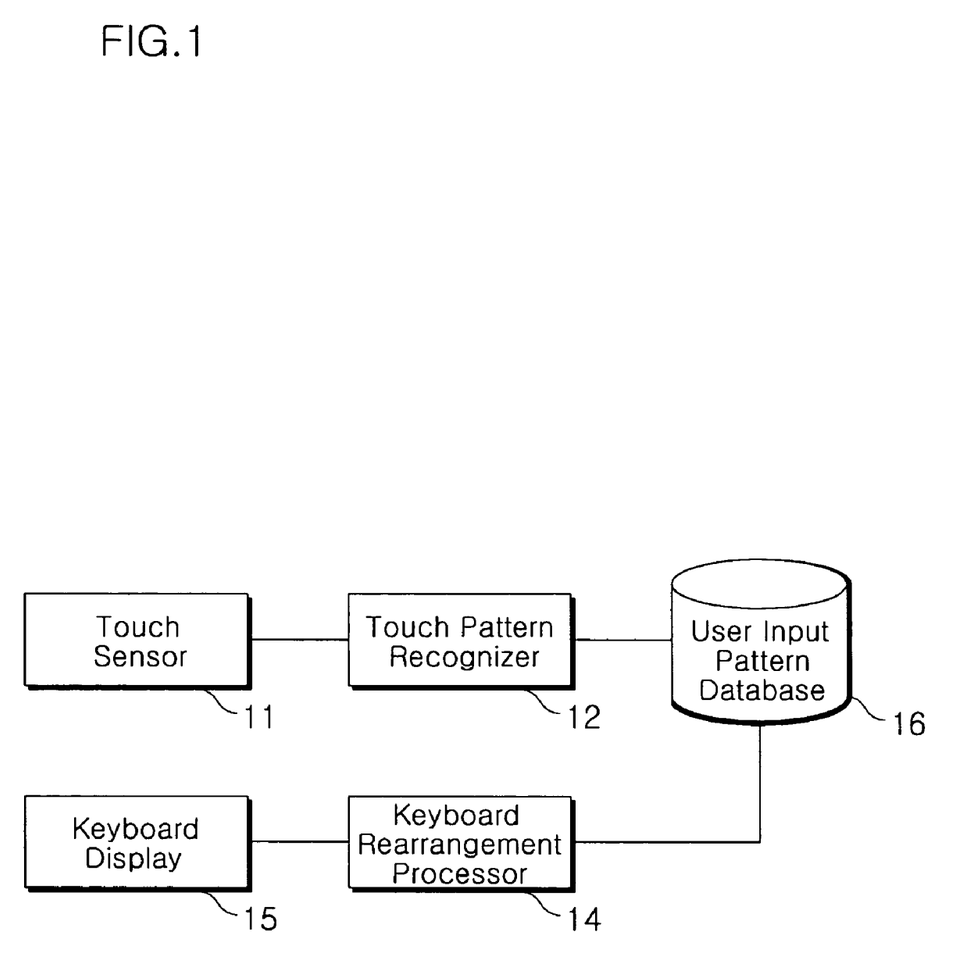
FIG. 1 illustrates one example of the configuration of an apparatus for providing an adaptive on-screen keyboard according to the present invention.

Meanwhile, FIG. 1 illustrates one example of the configuration of an apparatus for providing an adaptive on-screen keyboard according to an embodiment of the present invention.

Referring to FIG. 1, the apparatus for providing an adaptive on-screen keyboard according to an embodiment of the present invention includes a touch sensor 11, a touch pattern recognizer 12, a keyboard rearrangement processor 14, and a keyboard display 15. The apparatus may further include a user input pattern database 16.

The touch sensor 11 detects touch action of the user who touches a touch screen. The touch sensor 11 detects a position and an area of at least one contact resulting from the touch action of the user using a multi-touch sensor. At this time, the touch sensor 11 may detect at least one contact in such a manner as to present to the user an instruction for requesting the user to touch at least one reference finger and allow the user to touch the at least one reference finger on the touch screen in response to the instruction, or in such a manner as to present to the user an instruction for requesting the user to input a predetermined word and allow the user to input the predetermined word on the touch screen in response to the instruction.

For example, the user is presented with a specific word in order to select the position of his/her first finger, and then is allowed to input the specific word. Thereby, the keyboard can be arranged on the basis of the user's input. When the user supposes a physical QWERTY keyboard to be displayed on the screen without looking at the screen for the keyboard, and inputs the presented word out of old habit, the touch sensor arranges the keyboard on the basis of the position of the input word. In this state, the user can input characters.

The touch pattern recognizer 12 recognizes a touch pattern of the user using the detected touch action of the user. The touch pattern recognizer 12 recognizes the touch pattern of the user by checking to which key of which region each contact corresponds using the position and area of the detected at least one contact.

The keyboard rearrangement processor 14 reconstructs the arrangement of the keys on the on-screen keyboard provided through the touch screen on the basis of the recognized touch pattern of the user. In other words, the keyboard rearrangement processor 14 reconstructs the key arrangement by adapting positions and sizes of the keys to the touch pattern of the user on the basis of the position and area of the detected contact.

In another embodiment of the present invention, the keyboard rearrangement processor 14 may obtain a curve passing a midpoint of the detected at least one contact, and reconstruct the key arrangement in a preset curve region on the basis of the obtained curve.

The keyboard display 15 displays the on-screen keyboard on the basis of information on the reconstructed key arrangement.

As described above, the apparatus for providing an adaptive on-screen keyboard according to an embodiment of the present invention further includes the user input pattern database 16, in which information on the touch pattern of the user including the position and area of the detected at least one contact, and information on the key arrangement corresponding to the touch pattern of the user are stored. The user input pattern database 16 stores the information on the touch pattern of the user, which is recognized by the touch pattern recognizer 12, along with the information on the key arrangement which is reconstructed by the keyboard rearrangement processor 14. This is to obtain the entire pattern for the user's key input, and in this case, the keyboard rearrangement processor 14 can reconstruct the key arrangement according to the touch pattern of the user on the basis of the information on the touch pattern of the user from the user input pattern database 16. Further, the keyboard rearrangement processor 14 may store the information on the touch pattern of the user and the reconstructed key arrangement in the user input pattern database 16, and reflect the stored information in the key arrangement afterwards.

The apparatus for providing a user-adaptive on-screen keyboard according to an embodiment of the present invention detects the position and area of the contact touched through the touch sensor 11 when the user inputs the characters through the screen. At this time, a method of detecting the position and area of the touched contact is illustrated in FIGS. 2A and 2B.

Figure 2A:
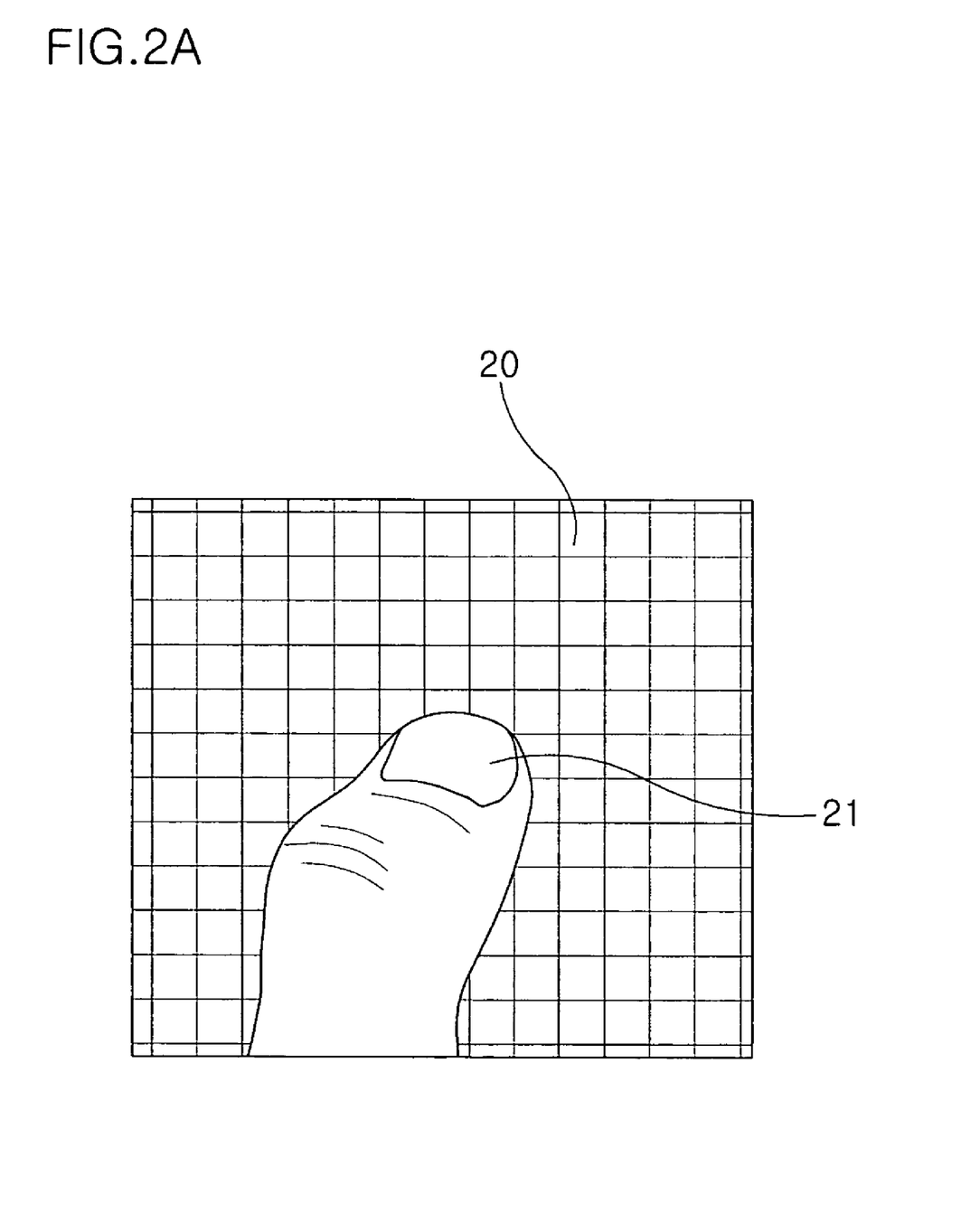
FIGS. 2A and 2B are schematic views for explaining a process of extracting a touch pattern of a user according to the present invention.
Figure 2B:
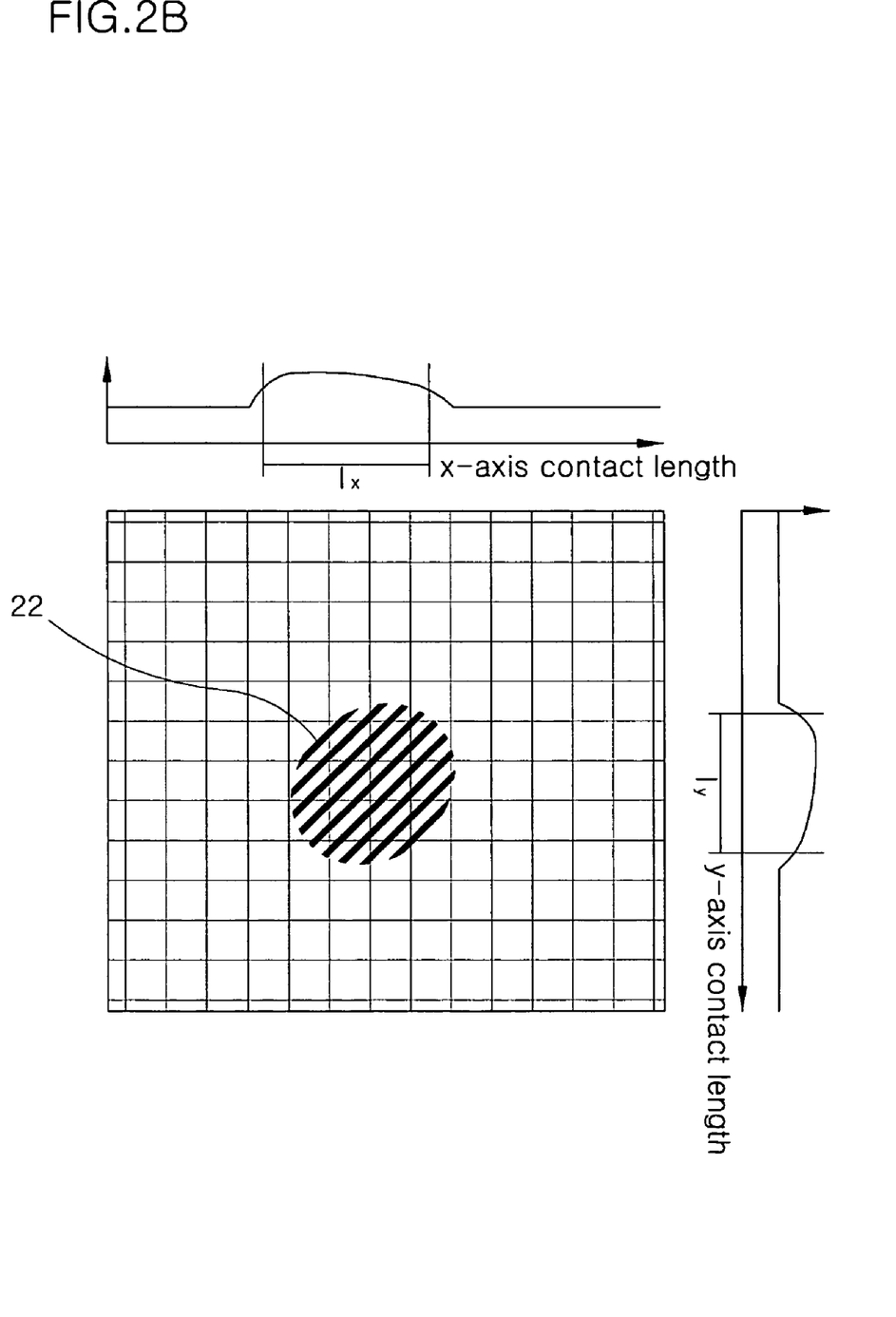

FIGS. 2A and 2B are schematic views illustrating a process of obtaining the shape of a finger from an input finger touch signal according to an embodiment of the present invention.

As illustrated in FIG. 2A, the user performs a finger input 21 on a touch screen 20. Then, as illustrated in FIG. 2B, the touch sensor 11 obtains values of the position and area of a contact on x and y axes from a touch mark 22.

The touch pattern recognizer 12 checks to which key of which region the detected contact corresponds. In this case, the touch mark 22 may cover the input keys of several regions. In this situation, various embodiments may be provided regarding which input key is assigned to the touch mark 22. However, in the current embodiment of the present invention, for the convenience of description, the case in which the input key occupying the widest region of the touch mark 22 is adopted as a contact value of the input key is merely described illustratively without consideration of a detailed algorithm for the assignment.

The keyboard rearrangement processor 14 reconstructs the keys by calculating coordinates, orientations, areas, etc. of the input keys such that the input keys can be arranged to the positions and areas of the contacts. The keyboard display 15 adaptively displays images of the input keys according to information on the key arrangement.

Both the information on the touch pattern of the user, which is created from the touch pattern recognizer 12, and the information on the key arrangement, which is created by the keyboard rearrangement processor 14, are stored in the user input pattern database 16, and are used as reference information for the key arrangement afterwards.

On the basis of the aforementioned configuration of the apparatus for providing an adaptive on-screen keyboard according to an embodiment of the present invention, its operation will be described in detail.

First, the touch sensor 11 detects the position and area of at least one contact of a user finger through the touch screen 20.

In general, in the case of the touch screen having a single contact, a value of the position $P(x, y)$ of a touched region is provided, and a value of the area of the touched region may be obtained through a change in signal value relative to the x and y axes. In other words, as illustrated in FIG. 2B, the touch sensor 11 obtains side lengths of the touch mark 22, which has the higher one of the signal values of the x and y axes due to creation of the contact, and then calculates an area $A(l_x \cdot l_y)$ of the touch mark 22 using the obtained values.

In contrast, in the case of the touch screen having a plurality of contacts, values $(x, y)$ of the positions of the contacts are provided. A touched area may be obtained by grouping neighboring contacts. The touch sensor 11 recognizes initial contacts that are touched for a predetermined time, and then calculates the touch position and area of each finger. Subsequently, the touch sensor 11 makes a group of neighboring coordinate values that are input within a predetermined time, and calculates midpoints and area with respect to the grouped contacts. Thereby, the midpoint serving as a reference position of each input key and the area of the touch mark for each input key can be obtained.

In this manner, the coordinate value of at least one contact of the input means (e.g., finger) of the touch screen and area data of the touch mark are provided to the touch pattern recognizer 12 by the touch sensor 11.

Meanwhile, the touch pattern recognizer 12 calculates the position of the touch mark and the size of the finger on the basis of the touch signal values (e.g., the coordinate value(s) of the contact(s) of the input means of the touch screen and the area data of the touch mark) input from the touch sensor 11. In other words, the touch pattern recognizer 12 determines by which finger the touched region is created, and then transmits the determined information to the keyboard rearrangement processor 14. Further, the touch pattern recognizer 12 recognizes all of the touch signal values that are input from the touch sensor 11, and outputs the recognized results as character input signals. In order to output the character input signals, the touch pattern recognizer 12 receives the rearrangement information, which is processed by the keyboard rearrangement processor 14, from the user input pattern database 16.

Figure 3A:
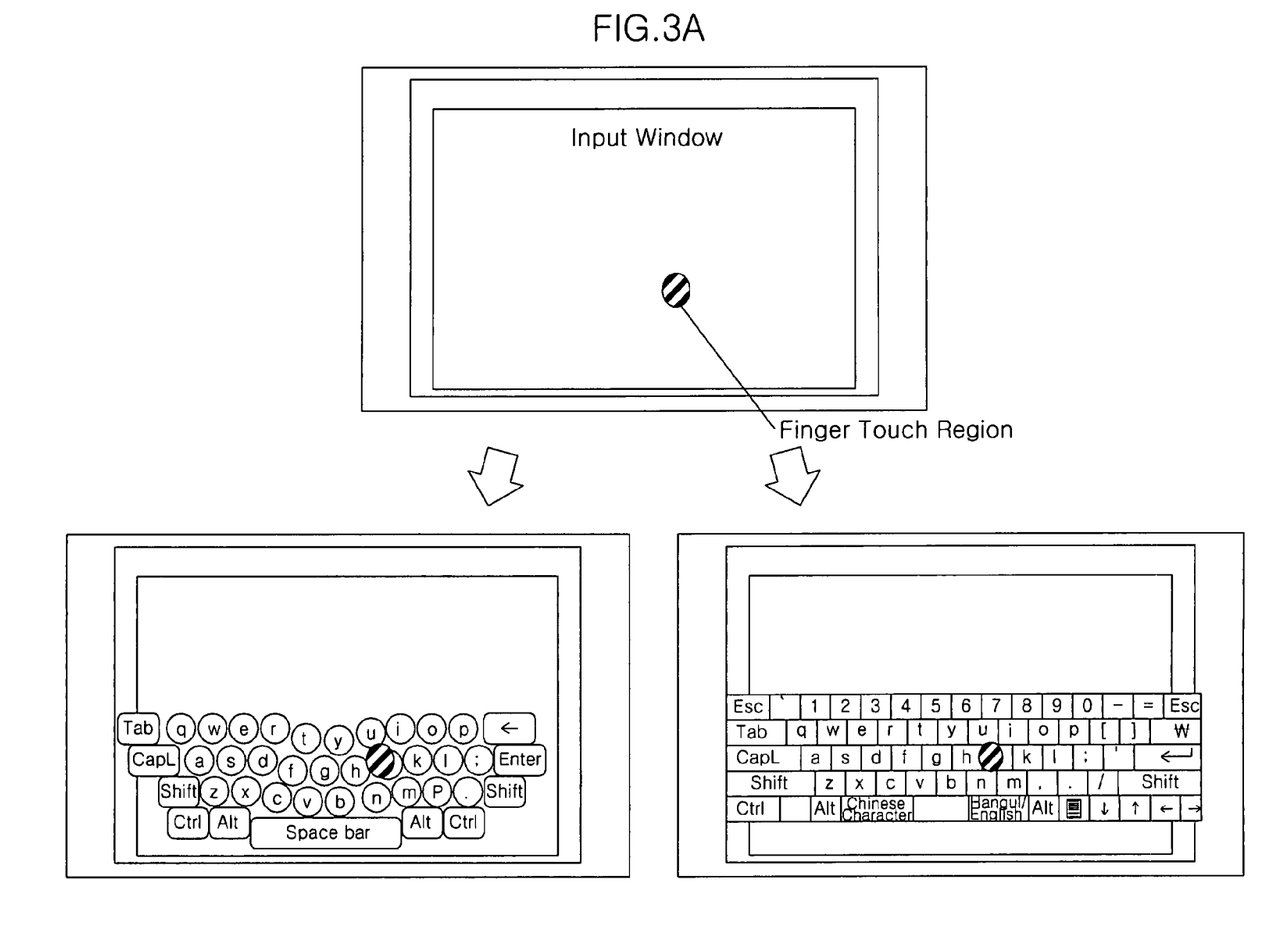
FIGS. 3A through 3C illustrate examples of an adaptive on-screen keyboard which are classified on the basis of the number of detected contacts according to the present invention.
Figure 3B:
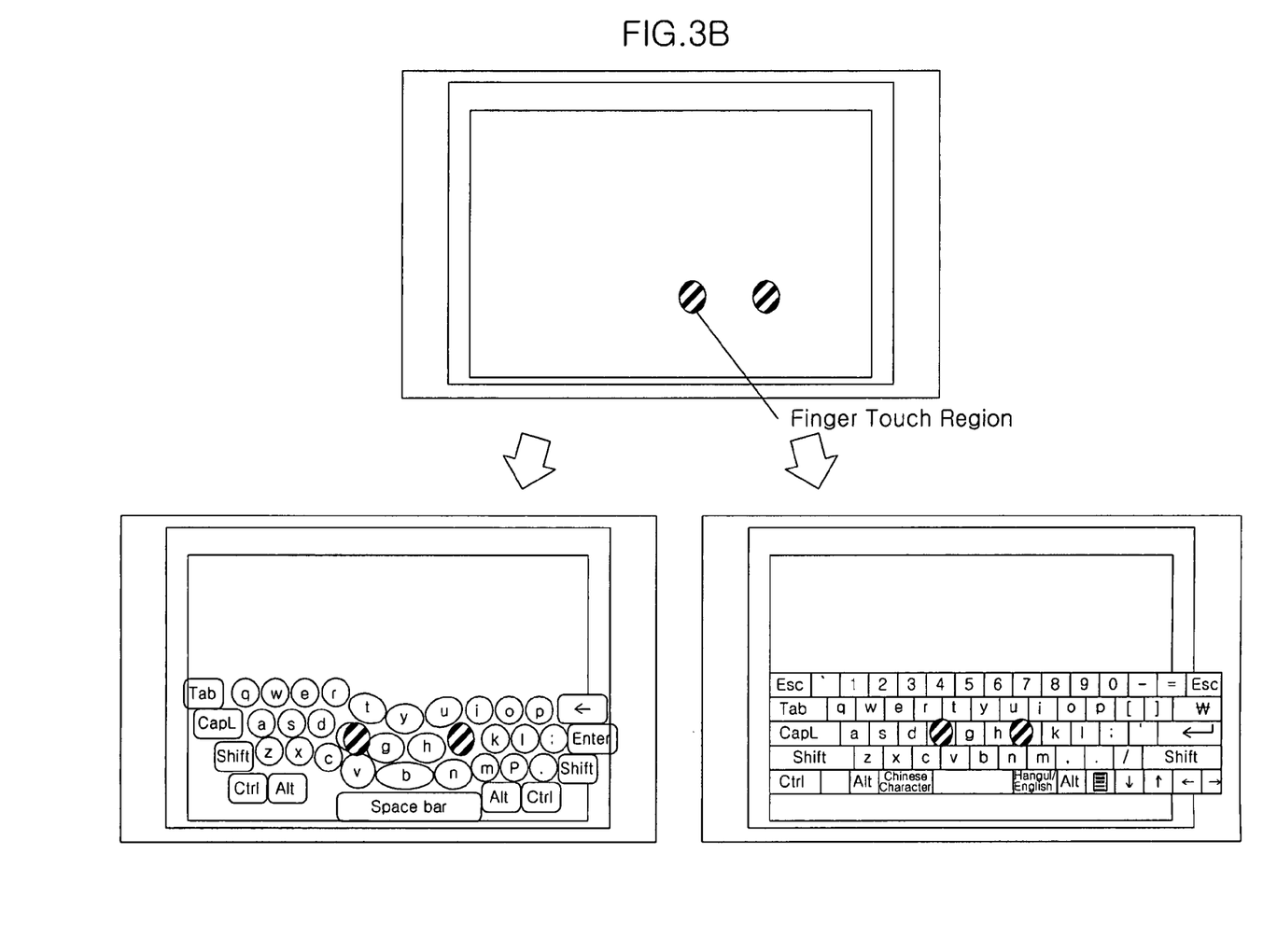
Figure 3C:
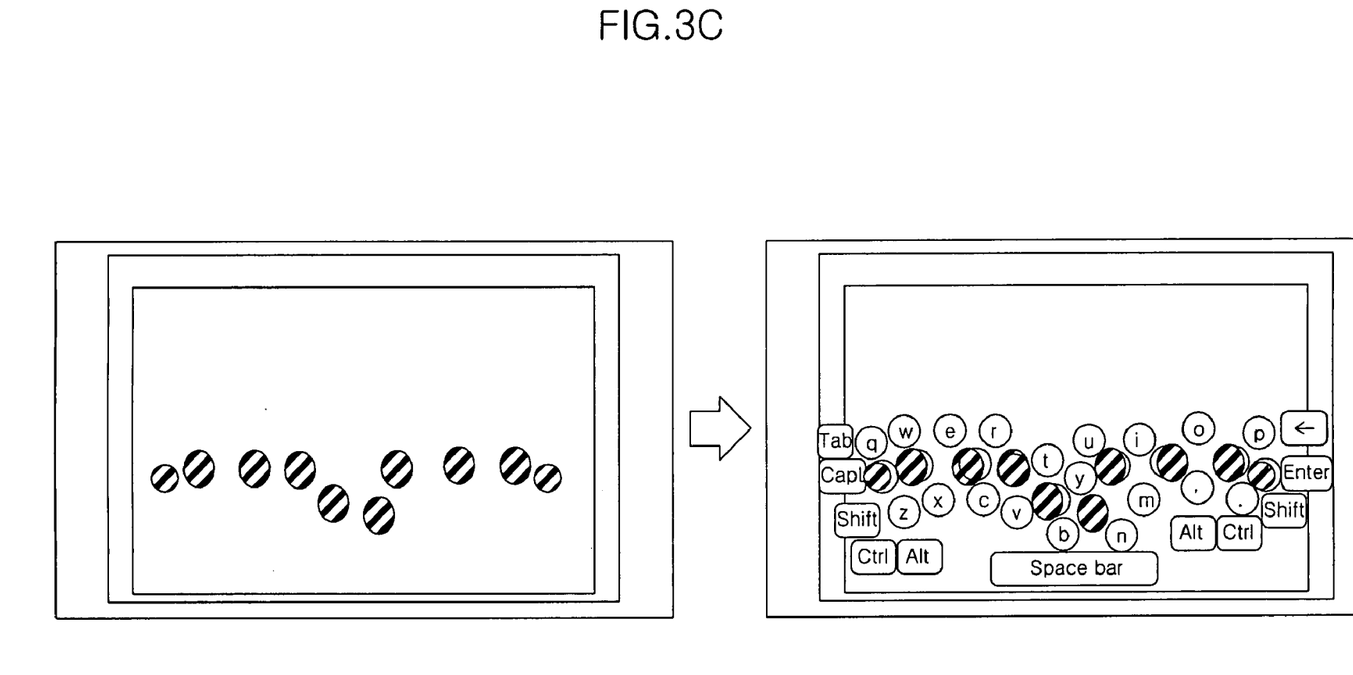

FIGS. 3A, 3B and 3C illustrate examples of an adaptive on-screen keyboard which are classified on the basis of the number of detected contacts according to an embodiment of the present invention. The following description relates to the process of determining by which finger the touched region is created.

FIG. 3A illustrates the case of a touch screen having a single contact, in which the lower left figure illustrates an example in which adaptively reconstructed key arrangement is provided by reflecting the position and area of the contact, and the lower right figure illustrates an example in which basic key arrangement is provided in consideration of only the position of the contact.

(1) Algorithm for Recognizing Reference Position of Keyboard of Touch Screen Having Single Contact Referring to FIG. 3A, the touch pattern recognizer 12 provides a first contact as a position value of an index finger serving as a criterion for the keyboard rearrangement. It is assumed that the touch screen is equally divided into two regions: left and right regions. When the contact is located on the left region, it is recognized as the index finger ("f") of the left hand. In contrast, when the contact is located on the right region, it is recognized as the index finger ("j") of the right hand.

At this time, the algorithm for determining the reference position of the keyboard may be expressed as follows.

---
$P(X_p, Y_p)$: Coordinates of the input contact in the screen
coordinate system, wherein the lower left contact is set to (0,0)
 If $X_p <$ Screen_Width/2 //the left region is touched
  P is set to the position of the "f" key
 Else //the right region is touched
  P is set to the position of the "j" key
---

(2) Algorithm for Recognizing Reference Position of Keyboard of Touch Screen Having Two Contacts As another example, FIG. 3B illustrates the case of a touch screen having two contacts. The key arrangement may be reconstructed by setting the index fingers of both hands as the coordinates of the reference position of the keyboard.

At this time, the algorithm for determining the reference position of the keyboard may be expressed as follows.

---
$P_n(X_{pn}, Y_{pn})$: Coordinates of the $n^{th}$ input contact
If $X_{p1} < X_{p2}$
 $P_1(X_{p1}, Y_{p1})$ is set to the position of the "f" key
 $P_2(X_{p2}, Y_{p2})$ is set to the position of the "j" key
Else
 $P_1(X_{p1}, Y_{p1})$ is set to the position of the "j" key
 $P_2(X_{p2}, Y_{p2})$ is set to the position of the "f" key
---

(3) Algorithm for Recognizing Reference Position of Keyboard of Touch Screen Having Sequential Input Contacts As still another example, the positions of the fingers may be sequentially input one per contact as set by the user. For example, in the case of the left hand, the little finger is touched to the touch screen first, and then the other fingers are alternately touched. Finally, the thumb is touched. This is equally applied to the right hand. As a result, the positions of the 10 fingers (eight fingers and two thumbs) may be registered.

At this time, the algorithm for determining the reference position of the keyboard may be expressed as follows.

---
$P_n(X_{pn}, Y_{pn})$: Coordinates of the $n^{th}$ input contact,
where n=0,1,2,3,..., 8 and 9, which correspond to 10 keys including
a, s, d, f, g, h, j, k and l keys.
 [Case of coordinate setting of 10 fingers]
 For( i=0; i<10 ; i++)
  Request to input the contact of the $i^{th}$ finger
  If $P_i(X_{pi}, Y_{pi})$ input of the contact
   $P_i(X_{pi}, Y_{pi})$ is set to the position of the key for the $i^{th}$ finger
  After the input of the contact of the $i^{th}$ finger is completed, proceed to the process for the next finger
---

(4) Algorithm for Recognizing Reference Position of Keyboard of Touch Screen Having Multiple Contacts As yet another example, FIG. 3C illustrates the case of a touch screen having multiple contacts. The touch pattern recognizer 12 recognizes an initial contact (after the initial contact is created, the fingers are placed on the touch screen within a predetermined period of time, until the user stays motionless for n seconds with any finger placed on the touch screen), and calculates the position and area of each contact. The calculated information is used to designate positions of the reference keys (e.g., 10 keys including a, s, d, f, g, h, j, k and l keys) that correspond to the 10 fingers.

More specifically, the touch pattern recognizer 12 receives information on the positions and areas of the multiple contacts from the touch sensor 11, and matches the contacts with the respective fingers by comparing the positions of the midpoints of each group throughout the touch screen. Then, the touch pattern recognizer 12 creates information on the key arrangement on the basis of the touched areas and positions of the fingers. At this time, an adaptive on-screen keyboard suitable for the size of each finger of the user may be provided with reference to proper information, which is stored in the user input pattern database 16 in conjunction with the sizes of the keys, on the basis of the touched areas of the user's fingers.

Information on the contacts created thereafter is used to determine which key is input on the basis of the information on the key arrangement. The information on the key arrangement may be stored in the user input pattern database 16

At this time, the algorithm for recognizing the reference position of the keyboard may be expressed as follows.

---
$P_n(X_{pn}, Y_{pn})$ : Coordinates of the midpoint of each touch group
 [Case of 10 touch groups]
 $P_i(X_{pi}, Y_{pi})$ is sorted in regular sequence in which the value of x
increases → $P'_i(X_{pi}, Ypi)$
 For( i=0; i<10; i++)
  $P'_i(X_{pi}, Y_{pi})$ is set to the position of the key for the $i^{th}$ finger.
 [Case of 10 or less touch groups]
 $P_i(X_{pi}, Y_{pi})$ is sorted in regular sequence in which the value of x
increases → $P'_i(X_{pi}, Y_{pi})$
 The basic key pattern is fetched from the user input pattern database.
 The position of each key is set by comparison of the key pattern and
the position of $P'_i(X_{pi}, Y_{pi})$.
---

As described above, once the touch pattern recognizer 12 has recognized the reference position through the process of recognizing the contacts, the keyboard rearrangement processor 14 determines the key arrangement, so that it can be recognized which character is input based on the information on the key arrangement and information on subsequent contacts. In other words, when the user inputs the character, the touch sensor 11 detects the area of the input contact. Then, the midpoint of the area is calculated and then compared with the key arrangement coordinates, so that a corresponding key is recognized. Whenever the keys are input, the coordinates of each input key are stored in the user input pattern database 16. Thereby, the stored coordinates can be reflected in the calculation for the key rearrangement afterwards.

Meanwhile, the user input pattern database 16 may store the information on the key arrangement such as information on the basic key arrangement in order to provide the adaptive on-screen keyboard in consideration of only the reference position of the contact, wherein the size range of the proper key according to the size of the touched finger, coordinates of the position of the touched input contact according to each character input by the user, and average values and areas of the input positions storing the positions of the keys for the characters are no longer considered.

Here, the size range of the proper key according to the size of the touched finger of the user may be defined on the basis of previously collected information on both the sizes of the fingers of many persons and the touched area when each person touches the screen. The touched areas are sorted into three (large, medium and small) levels or $n^{th}$ levels, for each of which an optimal size range of the key is defined. Then, these data may be stored in the user input pattern database 16.

Further, the minimum and maximum sizes of the input key may be defined in advance according to the size of the touched finger. At this time, the size of the input key is determined in consideration of the size of the display screen. In the case in which the touched area is too large or small, the size of the input key may be set to the minimum or maximum size defined in advance. Further, in the case in which any key exceeds a preset range, the keyboard may be provided as a default keyboard defined by the information on the basic key arrangement.

Meanwhile, on the basis of the results of recognizing the position and area of the contact of the finger, the keyboard rearrangement processor 14 arranges the keys corresponding to the respective recognized areas so as to be matched with the positions of the fingers. To this end, the key arrangement information stored in the user input pattern database 16 may be used. Further, on the basis of the results of recognizing the position and area of the contact of the finger, the input keys are arranged so as to be matched with the respective touched areas using the coordinates of the center. If the key arrangement is impossible at a start position, this is displayed, or a preset basic keyboard is provided.

Examples of the key arrangement will be described below in greater detail according to the type of the touch screen.

First, in the case of the touch screen having a single contact (see FIG. 3A), a distinction is made between the left hand and the right hand, and the position of each key is designated on the basis of the position of the index finger of one of the left and right hands. In other words, the keyboard pattern, which will be arranged is fetched from among the keyboard patterns stored in the user input pattern database 16 or the keyboard pattern designated as a default such that the "f" or "j" key is located at the position of a designated contact. Then, if all of the keys are not displayed on the screen with the "f" or "j" key as the starting point, it is determined that the key arrangement is impossible.

Further, in the case of the touch screen having two contacts (see FIG. 3B), if a distance, $l_{fj}$, between the "f" key and the "j" key is so short that there is not sufficient for the "g" and "h" keys, it is determined that the key arrangement is impossible. Otherwise, a value of $c(l_{fj}-key\_width)/2$ (where c is the constant) is adopted as sizes of the "g, h, y and b" keys between the "f" key and the "j" key. This is applied to the key arrangement. The rest is calculated by the same method as in the case of the touch screen having a single contact.

In addition, in the case of the touch screen having multiple contacts, the key arrangement is determined on the basis of the coordinates obtained from the touch pattern recognizer 12. In other words, the coordinates are calculated on the basis of the coordinates of 10 positions. First, a method of designating the positions of 10 keys consisting of the "a, s, d, f, g, h, j, k, l and ;" keys serving as reference keys is as follows:

1) It is checked whether or not an interval between two adjacent contacts exceeds a value of $c*key\_width$ (where c is the constant). If so, an arrangement error message is transmitted.

2) Each key is arranged on the basis of the midpoint thereof. If the distance between two adjacent contacts exceeds a key interval, the keys are increased in width by a length of $k(l-key\_width)/2$ (where l is the distance between two adjacent contacts, and k is the constant) when arranged.

3) It is checked whether or not a superimposed region exceeds a predetermined limit, and the keys are arranged such that the corresponding region does not exceed the predetermined limit.

Figure 4:
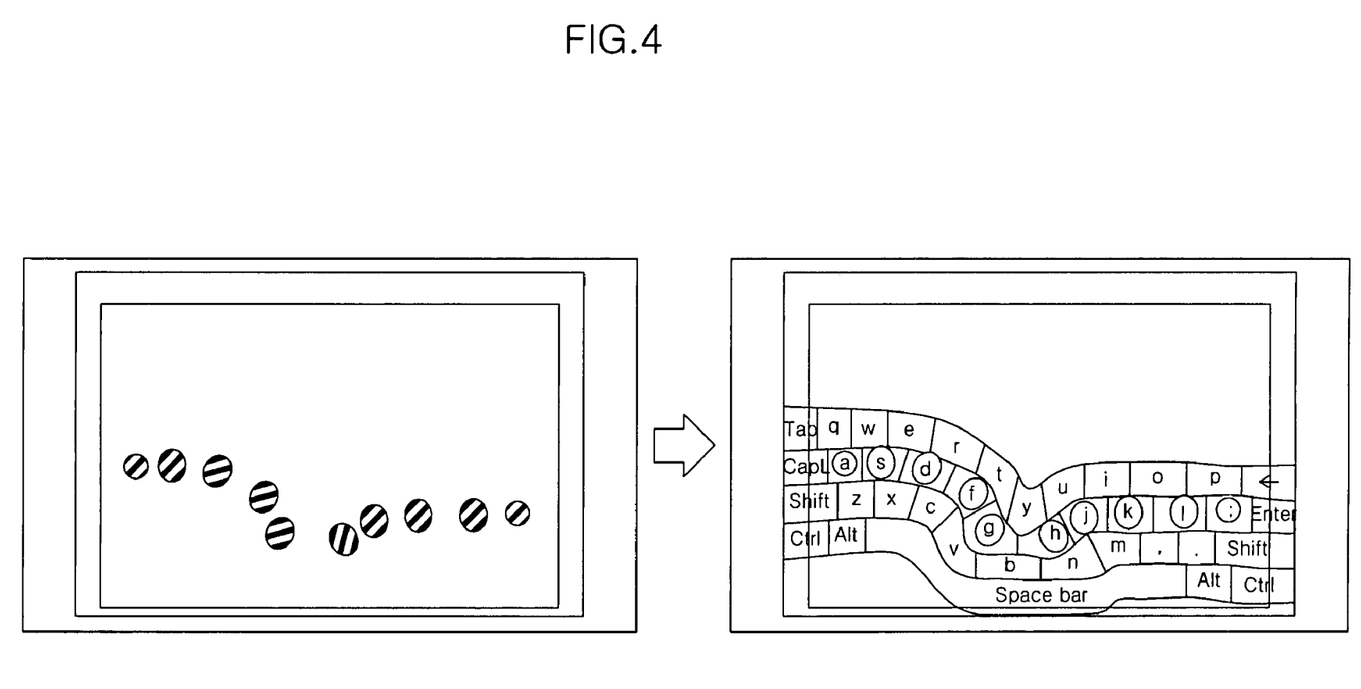
FIG. 4 illustrates an example of the key arrangement using a curve according to the present invention.

FIG. 4 illustrates another example of key arrangement using a curve according to the present invention. The example of FIG. 4 is different from the method 2). As illustrated in FIG. 4, a curve passing the midpoint of each key is obtained (using a curve algorithm such as spline or Bezier). Then, the obtained curve is transformed by $+\angle y$ and $-\angle y$ in the y-axis direction, so that a region is defined by two curves. A key region may be divided at the midpoint of each key on the basis of key_width and an interval between adjacent contacts. After 10 reference keys are arranged, the remaining keys are automatically arranged in consideration of the position of each key. To this end, a relative position of each key is stored in the user input pattern database 16 to be used.

When this process for the key arrangement is completed, information on the arrangement of the reconstructed keys is stored in the user input pattern database 16. This information may be used by the touch pattern recognizer 12 to distinguish the keys for the character input.

Further, as the rearranged keyboard is used, the positions of the contacts input by the user are recorded on the user input pattern database 16. When the key arrangement for the user is calculated on the basis of the recorded data later again, the position of each key may be determined through this information. In this case, the position of the key, which is frequently input by the user, has a high probability of serving as a reference position. Thus, the character input may be carried out with higher precision.

The keyboard display 15 displays the on-screen keyboard on the basis of the key arrangement information received from the keyboard rearrangement processor 14. At this time, the key arrangement is performed using the information on the position and size of each key. If the key arrangement is impossible, either this information or the keyboard defined as the default is displayed on the screen.

Further, in order to increase convenience of use of the on-screen keyboard, the keyboard display 15 may provide the user with feedback such that, when inputting the keys, the user distinguishes the input keys from the other keys.

FIGS. 5A through 5D illustrate an example of a method for providing an adaptive on-screen keyboard according to the present invention. As illustrated, the adaptive on-screen keyboard may be provided to the user by providing feedback to the user.

Figure 6:
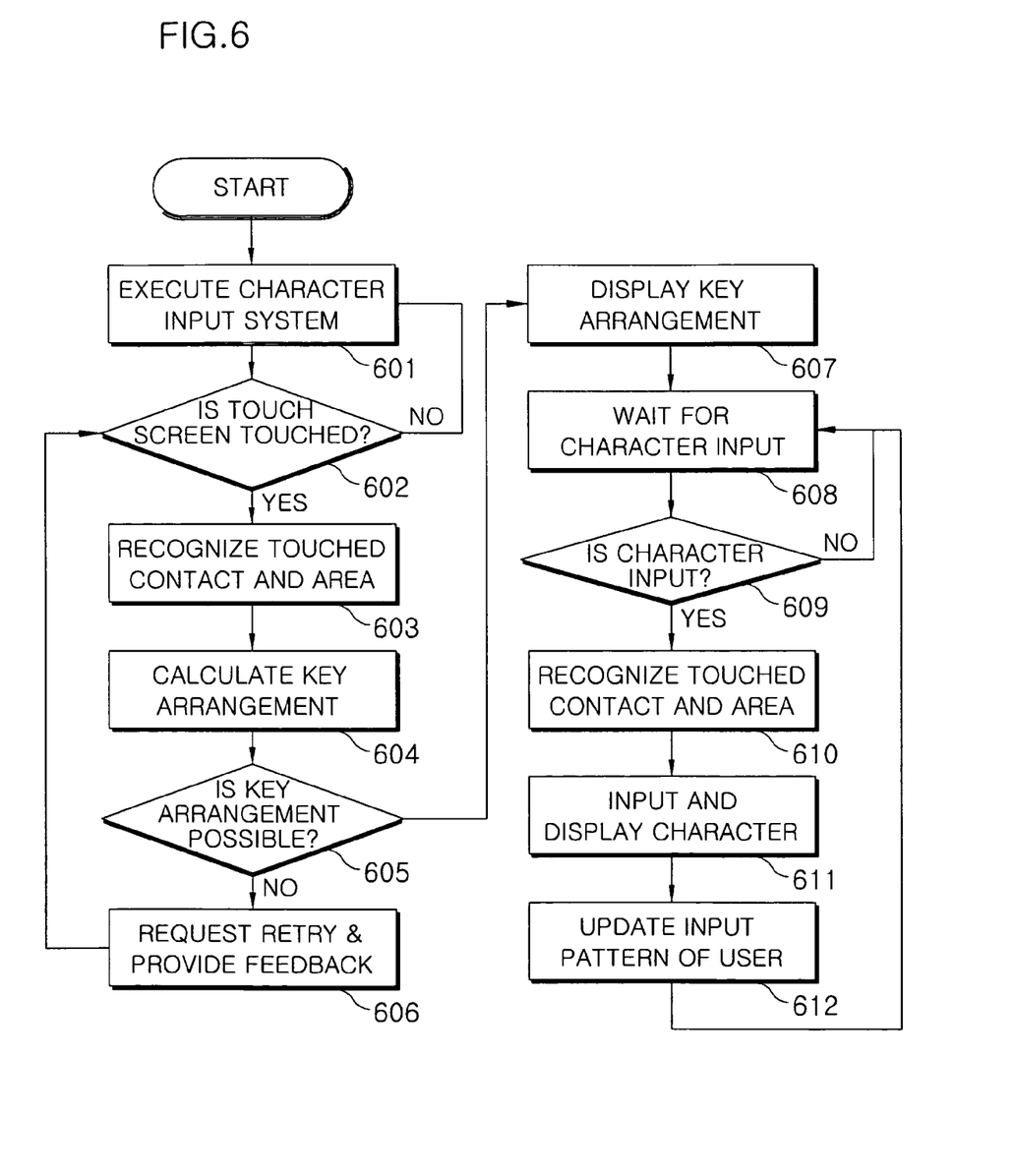
FIG. 6 is a flow chart illustrating a method for providing an adaptive on-screen keyboard according to an embodiment of the present invention.

The operation of the aforementioned apparatus for providing an adaptive on-screen keyboard may be summarized as in FIG. 6. FIG. 6 is a flow chart illustrating a method for providing an adaptive on-screen keyboard according to an embodiment of the present invention.

Referring to FIG. 6, the method for providing an adaptive on-screen keyboard according to the present invention involves executing a character input system (operation 601). When a touch screen is touched (operation 602), a touched contact and the area of a touched region are recognized (operation 603). Information on the key arrangement is calculated using the touched contact and the area of the touched region (operation 604).

As a result of the calculation, if the key arrangement is found to be possible, the keyboard is displayed (operation 607). In contrast, if the keyboard arrangement is found to be impossible, a retry request is made (operation 606). Then, it reverts to operation 602.

Figure 5A:
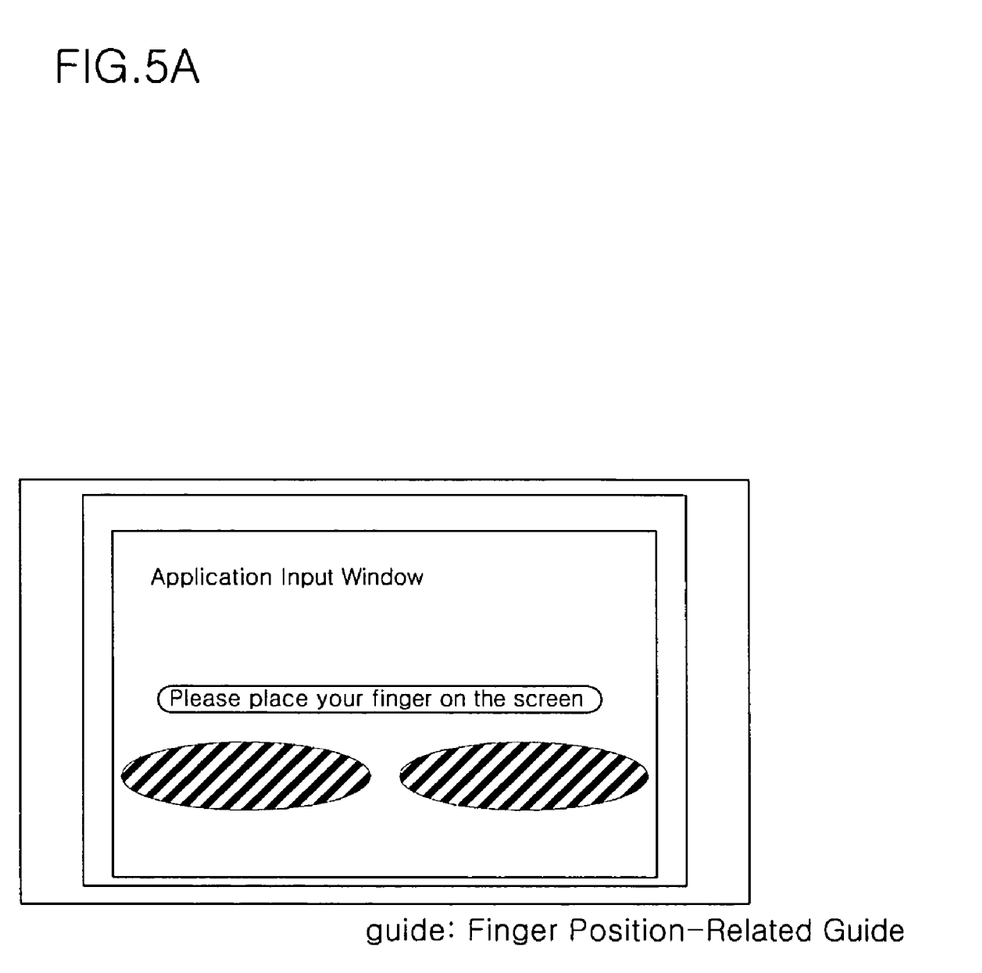
FIGS. 5A through 5D illustrate an example of a method for providing an adaptive on-screen keyboard according to the present invention.
Figure 5B:
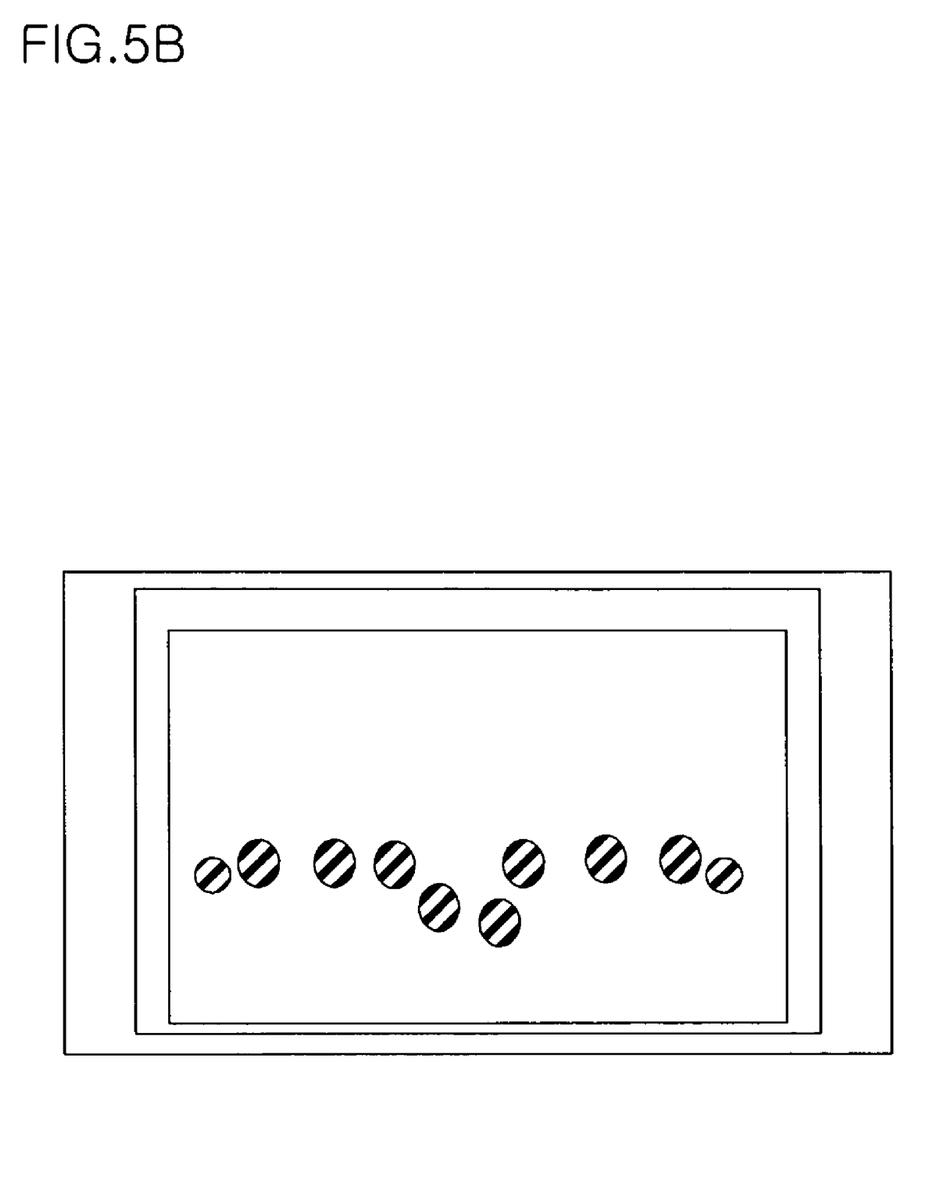
Figure 5C:
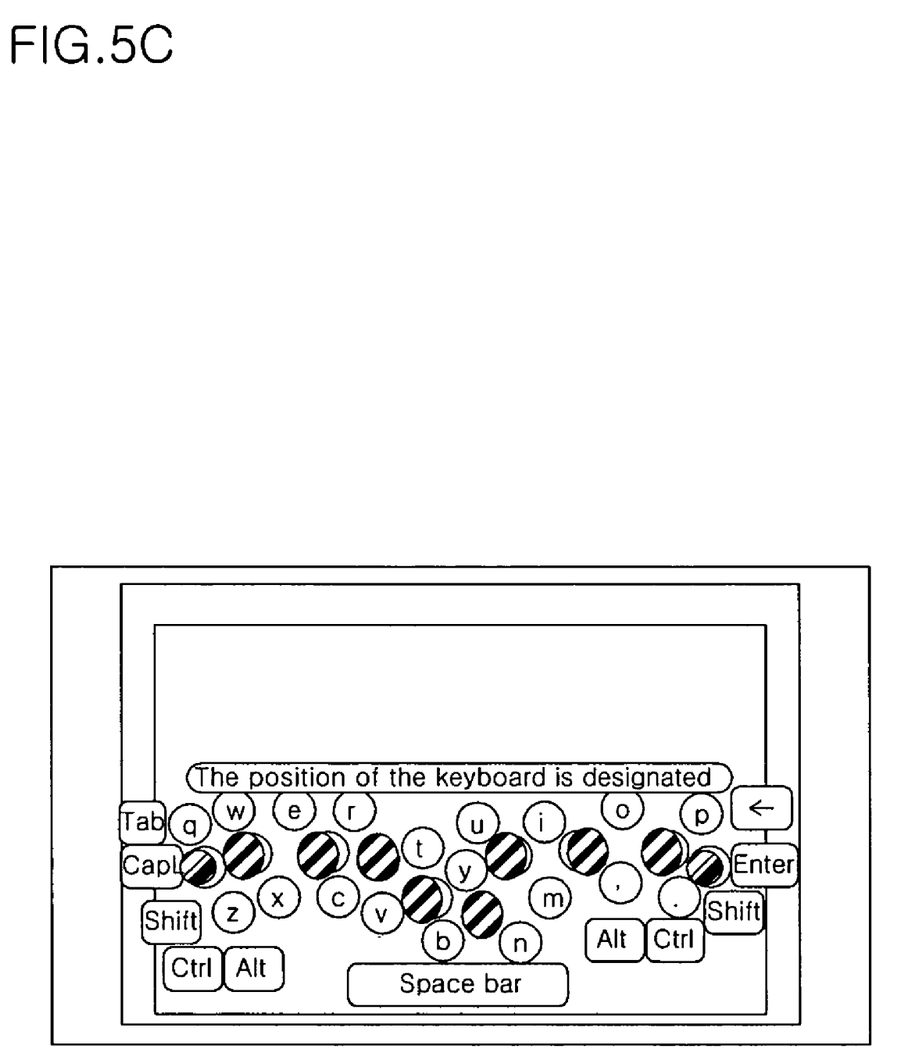
Figure 5D:
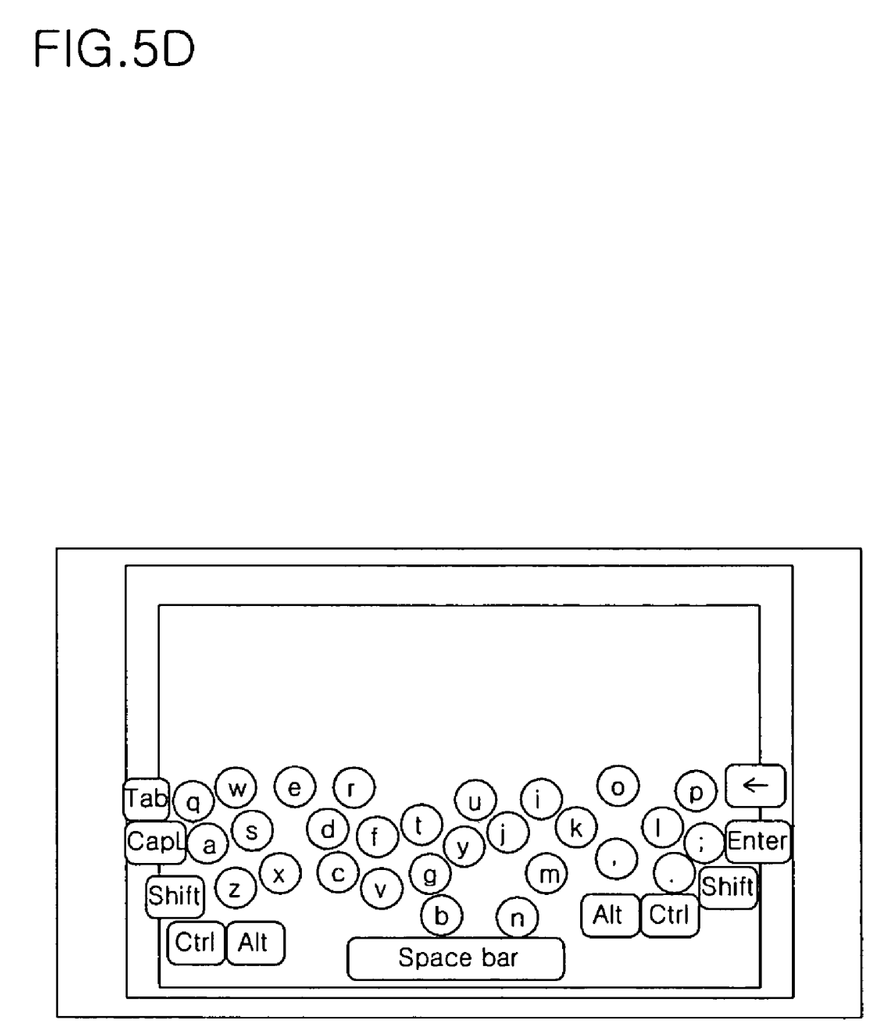

Meanwhile, after the keys are arranged again (operation 607), if at least one character is input (operations 608 and 609), for example, a mouse cursor is placed on a character input screen, an on-screen program for the character input is automatically executed, and a user is requested to designate a position of the key (FIG. 5A). At this time, if the position of a finger of the user who responds to the request corresponds to a value which makes it impossible to arrange the keyboard on the screen, an error message is displayed for the user. In contrast, if the position of the finger of the user who responds to the request corresponds to a value which makes it possible to arrange the keyboard on the screen, the key arrangement suitable for the position of the finger of the user is calculated (operation 610). This key arrangement may be displayed on the screen (operation 611).

As described above in detail, according to an embodiment of the present invention, the apparatus and method for providing a user-adaptive on-screen keyboard are provided in order to increase the convenience of use of the user of the on-screen keyboard. Thus, the keyboard is adaptively rearranged so as to be suitable for a posture which the user wants to assume, so that it respects the individuality of the user and can increase the convenience of use.

Further, the size of the touch-based input key is automatically matched with the size of the touched finger of the user, and the key arrangement can be changed to the position suitable for the user on the basis of a stored use habit of the user.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. An apparatus for providing an adaptive on-screen keyboard, comprising:
    a sensor for detecting at least one contact corresponding to a touch action of a user from a touch screen;
    a pattern recognizer for recognizing at least one first key of the on-screen keyboard corresponding to each contact;
    a rearrangement processor for reconstructing a key arrangement of the on-screen keyboard based on an obtained curve passing a midpoint of the at least one contact and mapping the at least one first key to a region defined by the obtained curve; and
    a display for displaying the adaptive on-screen keyboard on the basis of information on the reconstructed key arrangement.

2. The apparatus of claim 1, wherein the sensor detects a position and an area of the at least one contact corresponding to the touch action of the user using a multi-touch sensor.

3. The apparatus of claim 2, wherein the pattern recognizer recognizes a touch pattern of the user by checking to which key of which region each contact corresponds using the position and area of the detected at least one contact.

4. The apparatus of claim 2, wherein the rearrangement processor adjusts positions and sizes of multiple keys constituting the on-screen keyboard on the basis of the detected position and area of the at least one contact, and reconstructs the key arrangement to be adapted to a touch pattern of the user.

5. The apparatus of claim 2, further comprising a storage, which stores information on both a touch pattern of the user including the detected position and area of the at least one contact, and the key arrangement corresponding to the touch pattern of the user,
    wherein the rearrangement processor stores the information on the touch pattern of the user and the information on the reconstructed key arrangement in the storage, and reflects the stored results in the key arrangement afterwards.

6. The apparatus of claim 1, wherein, if an instruction for requesting the user to touch at least one reference finger on a touch screen is presented, the sensor detects at least one contact touched by the user in response to the instruction.

7. The apparatus of claim 1, wherein, if an instruction for requesting the user to input a predetermined word is presented, the sensor detects at least one contact touched by the user in response to the instruction.

8. The apparatus of claim 1, wherein the rearrangement processor maps at least one second key of the on-screen keyboard to a remaining region other than the region defined by the obtained curve.

9. A method for providing an adaptive on-screen keyboard, comprising:
    detecting touch action of a user from a touch screen;
    extracting at least one contact from the detected touch action of the user;
    recognizing at least one first key of the on-screen keyboard corresponding to each contact;
    reconstructing a key arrangement of the on-screen keyboard based on an obtained curve passing a midpoint of the at least one contact and mapping the at least one first key to a region defined by the obtained curve; and
    displaying the on-screen keyboard on the basis of information on the reconstructed key arrangement.

10. The method of claim 9, wherein the detecting of the touch action includes detecting the at least one contact by presenting an instruction for requesting the user to touch at least one reference finger, and allowing the user to touch the at least one reference finger on the touch screen in response to the instruction.

11. The method of claim 9, wherein the detecting of the touch action includes detecting the at least one contact by presenting an instruction for requesting the user to input a predetermined word, and allowing the user to input the predetermined word on the touch screen in response to the instruction.

12. The method of claim 9, wherein the recognizing includes checking to which key of which region each contact corresponds using a detected position and area of the at least one contact, and recognizing a touch pattern of the user.

13. The method of claim 9, wherein the reconstructing of the key arrangement includes adjusting positions and sizes of multiple keys constituting each on-screen keyboard on the basis of a detected position and area of the at least one contact, and reconstructing the key arrangement so as to be adapted to a touch pattern of the user.

* * * * *